United States Patent [19]

Larson

[11] Patent Number: 4,627,048
[45] Date of Patent: Dec. 2, 1986

[54] ROUTING ADDRESS BIT SELECTION IN A PACKET SWITCHING NETWORK

[75] Inventor: Mikiel L. Larson, St. Charles, Ill.

[73] Assignee: AT&T Bell Laboratories, Murray Hill, N.J.

[21] Appl. No.: 658,594

[22] Filed: Oct. 9, 1984

[51] Int. Cl.[4] ............................................. H04Q 11/04
[52] U.S. Cl. .................................. 370/60; 340/825.52
[58] Field of Search ............................. 370/60, 94, 99; 340/825.52

[56] References Cited

U.S. PATENT DOCUMENTS

| 4,049,906 | 9/1977 | Hafner et al. | 178/2 |
|---|---|---|---|
| 4,488,288 | 12/1984 | Turner | 370/60 |
| 4,494,230 | 1/1985 | Turner | 370/60 |
| 4,506,358 | 3/1985 | Montgomery | 370/60 |
| 4,516,238 | 5/1985 | Huano et al. | 370/60 |

OTHER PUBLICATIONS

E. Szurkowski, "The Uses of Multi-Stage Switching Networks in the Design of Local Network Packet Switches", *IEEE International Conference on Communications*, vol. 2, (1981), pp. 25.2.2–25.2.5.

*Primary Examiner*—Douglas W. Olms
*Assistant Examiner*—Frank M. Scutch, III
*Attorney, Agent, or Firm*—David Volejnicek

[57] ABSTRACT

A multi-stage packet switching network (100) includes a plurality of packet switching nodes (110) each included in one stage of a sequence of stages (101, 102, 103) of the network. Each node (101-1-x) of a stage (101) is connected to a stage bus (220-1) that indicates to the node "how manieth" stage in the sequence of stages it is a part of, i.e., where in the sequence of stages that node appears. Each node includes circuitry (450) that responds to the information carried by the associated stage bus to select "that manieth" most significant bit (504) of the destination field (502) of a received packet (500) as the bit on the basis of whose value the packet is routed at the node. On a circuit pack (200) that includes nodes of a plurality of stages, the first stage bus is connected to a register (250) whose contents are the number of the first stage of the pack in the sequence of stages. Adders (210) interconnect the stage buses of sequential stages and act to increment by one the value carried by each sequential stages' stage bus.

23 Claims, 5 Drawing Figures

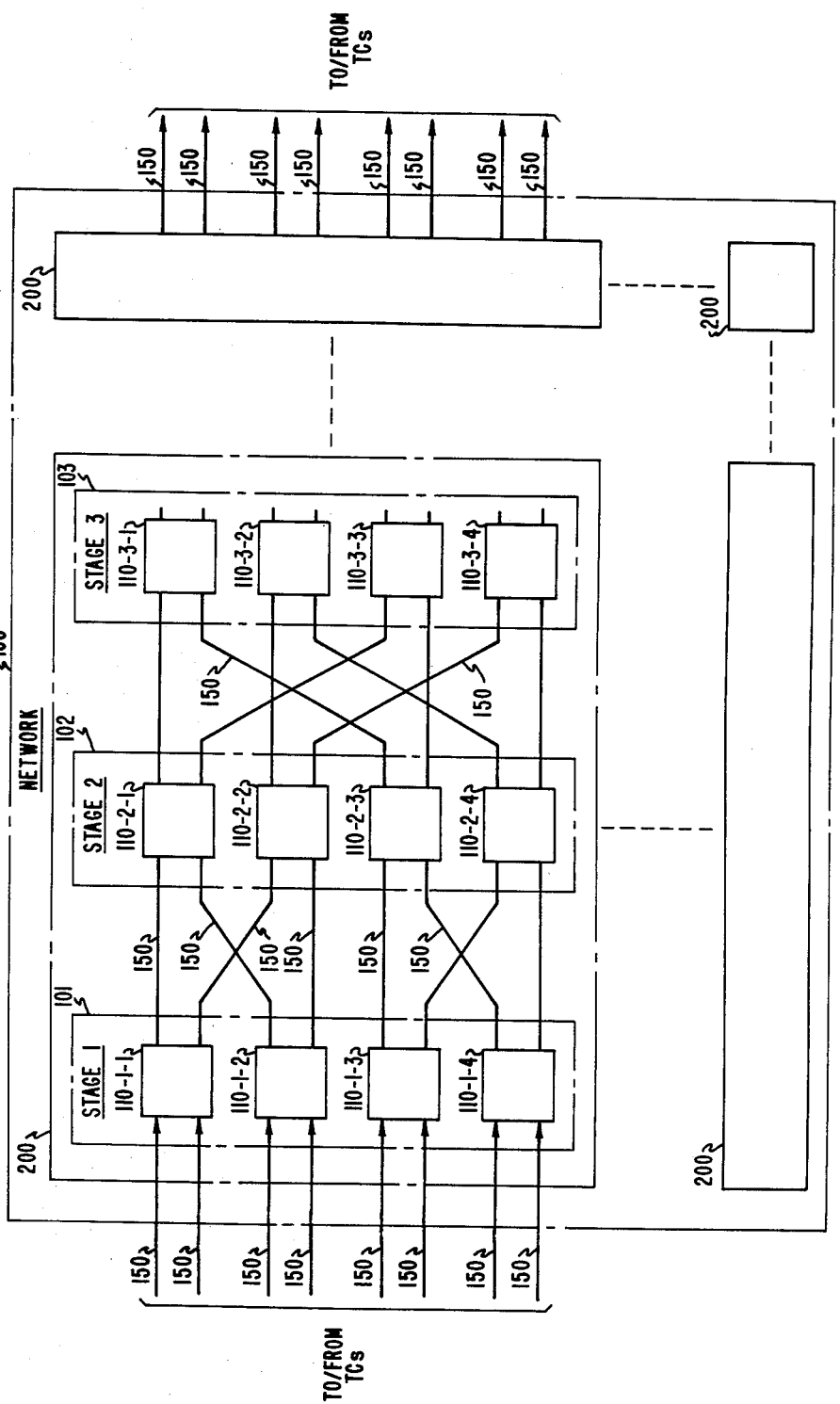

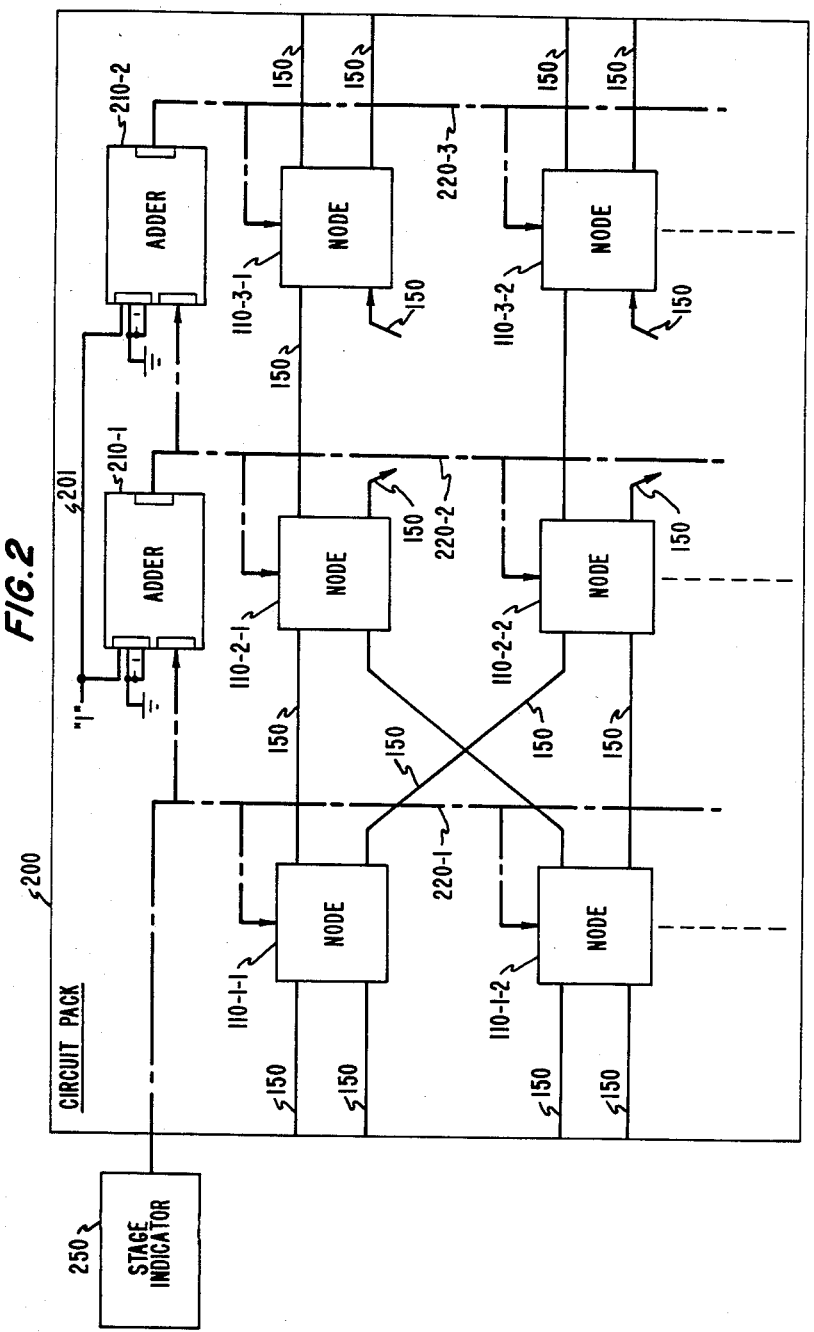

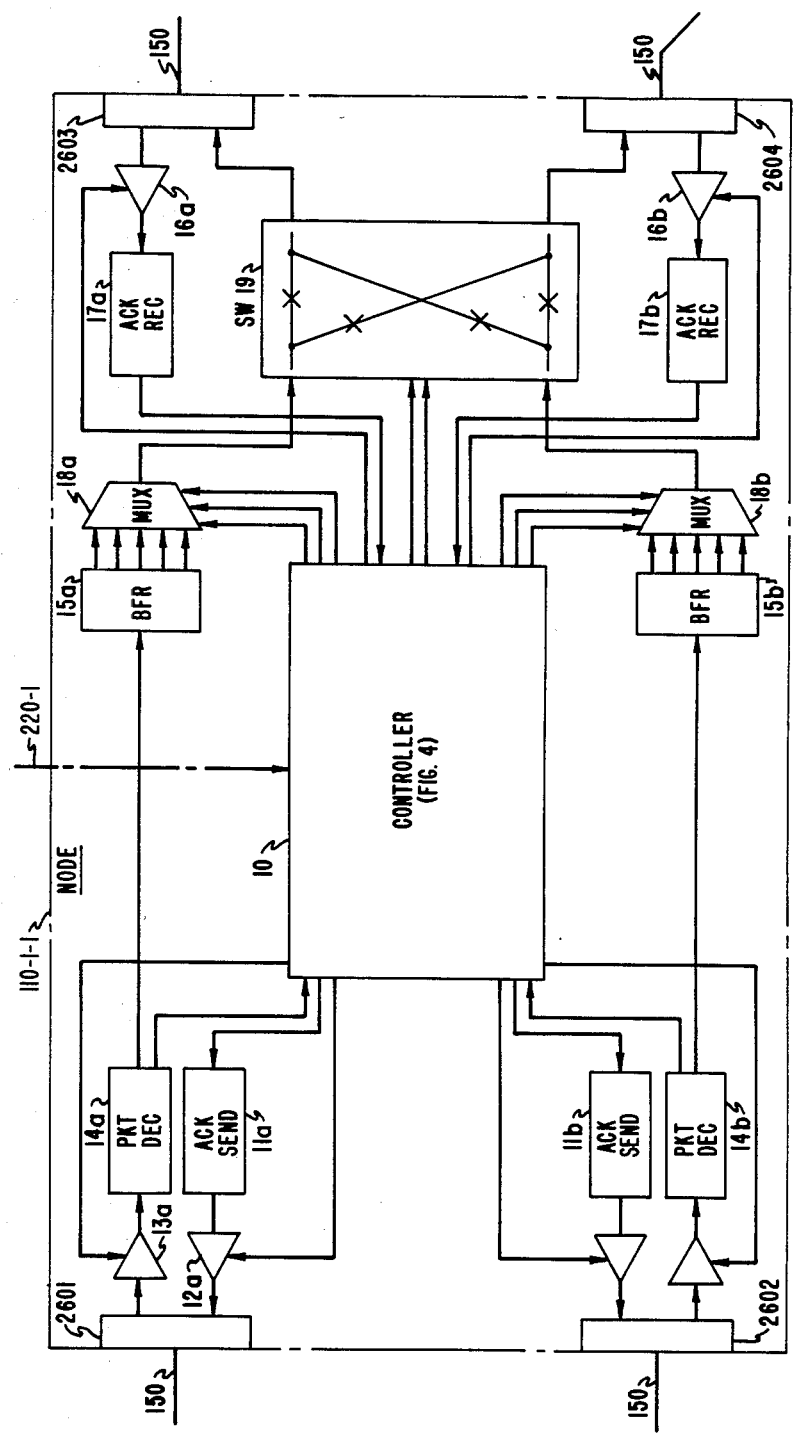

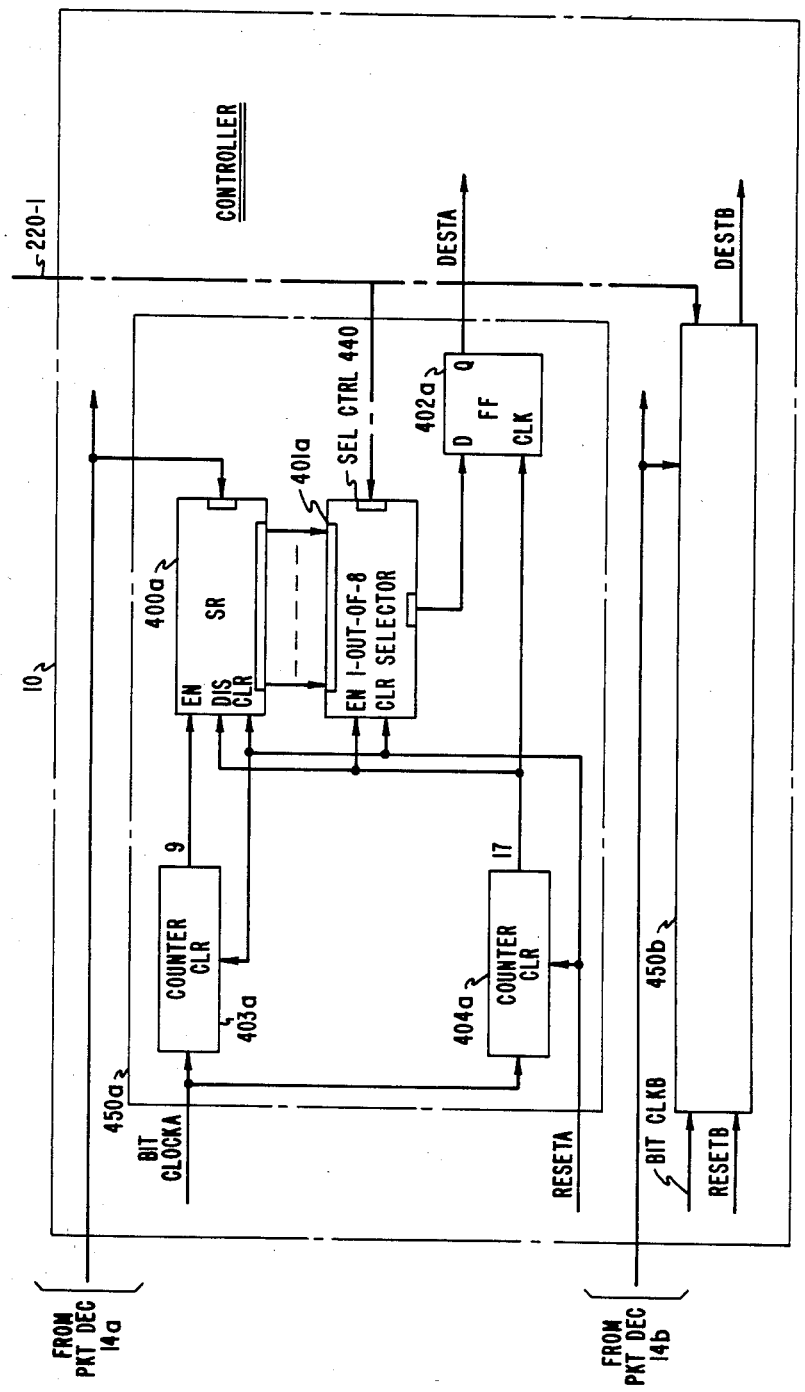

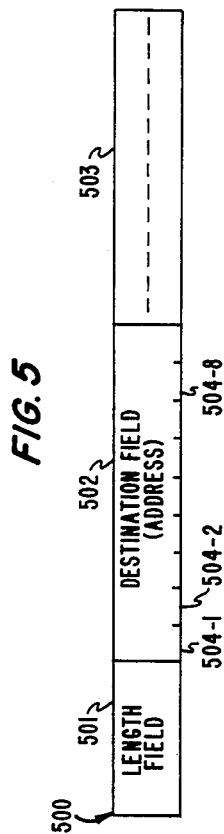

ROUTING ADDRESS BIT SELECTION IN A PACKET SWITCHING NETWORK

TECHNICAL FIELD

This invention relates to packet switching networks, and to a method of and arrangement for selecting elements of a packet address at nodes of such networks for routing the packet therethrough.

BACKGROUND OF THE INVENTION

A packet switching communication system comprises a plurality of communicating devices, such as computers, terminals, telephones, or data sets (referred to as hosts), that are interconnected for communication through a plurality of switching networks. Connection of the hosts to the switching networks, and of the switching networks to each other, is commonly accomplished by means of communication trunks. The trunks are coupled at each end either to a host by a host access interface or to a switching network by a trunk controller.

Each switching network comprises a plurality of interconnected switching nodes that function to connect packets incoming on a trunk to the appropriate one of a number of outgoing trunks, depending upon the destination of the communication that the packets represent. Each switching node is the basic switching element of a packet switching network. The nodes are arranged and interconnected to form a switching matrix. The matrix may be thought of as divided into a plurality of columns, called stages. The nodes of a network that are the first to switch packets that have been received by the network form the first stage; the nodes that receive packets from nodes of the first stage and are the second to switch packets form the second stage; and so on. Such packet switching systems are well-known in the art. A representative packet switching system is disclosed in U.S. patent application Ser. No. 392,378, to J. S. Turner, entitled "Fast Packet Switch", filed on June 25, 1982, issued on Jan. 1, 1985, as U.S. Pat. No. 4,491,945, and assigned to the same assignee as this application.

The design and characteristics of nodes vary widely from system to system. However, a common type of node has two signal inputs and two signal outputs. A packet of signals arriving at a node input is generally buffered within the node. Based on address information carried by the packet, the packet signal stream is then directed to either one of the two node outputs. In particular, each packet includes a destination address field which carries the binary address of the destination of the packet. Each node in the packet's path through the switching network responds to the value of a different one of the address bits to switch the packet to one or the other of its outputs, thereby routing the packet along its path. (A node having more than two outputs would respond to an address element comprising a plurality of address bits.)

In order for packets to be routed properly, each node must route a packet on the basis of the correct address bit. Hence each node must know which address bit is the appropriate one for it to respond to.

The art has used for this purpose a technique called address rotation. The gist of this technique is that each node responds to the address bit which occupies the most significant bit position in a packet's destination address field, and then rotates the address by one bit position before sending the packet on to the next node. Through rotation, the bit to which the node responded becomes the least significant bit in the destination field, and the bit to which the next node should respond assumes the most significant bit position.

While effective in providing each node in a packet's path with the proper address bit, this technique suffers from certain disadvantages. First, this technique requires each node to include address rotation circuitry which often is rather complex and expensive, depending on implementation. Second, address rotation takes time and hence it slows down the progress of packets through the network. Third, if an error code such as a cyclic redundancy check (CRC) code that is computed over the whole packet, including the destination address field, is carried by a packet, address rotation changes the value of the applicable error code, and hence the code must be recomputed at each node. Consequently, each node must include error code computing circuitry, and the packet's progress through the network is further slowed down by the operation of this circuitry. And fourth, address rotation requires the packet switching system to keep track of at least two, and commonly three, different address numbers for each packet. An example will best illustrate this situation.

Assume that a packet switching network has five switching stages, and each packet has a byte-wide destination field. The physical address of the destination, as expressed in the packet's destination address field, is for example "00001101", where the rightmost five bits define the packet's route through the five stages of the network. If address rotation to the right is used, the physical address must be changed to an entry form, expressed in the destination field as "00010110", before the packet is sent through the switching network, so that rotation will provide a node in each stage with the proper address bit in the most significant—the rightmost—bit position. Upon the packet's exit from the switching network, the address will have assumed an exit form as a result of the five rotations to the right, expressed in the destination field as "10110000". As can be seen, the physical address, the entry form, and the exit form are all different.

If addresses are rotated to the left instead of to the right in the network, and the leftmost instead of the rightmost bit position is considered to be most significant, there are only two forms of the address: the physical address and the entry form, which in this example is "01101000". The exit form is the same as the physical address.

The need to keep track of a plurality of address numbers for each packet adds complexity to the system hardware and software. For example, a trunk controller that interfaces a trunk to the switching network must include circuitry for converting the physical address of a packet to the entry form before sending a packet into the switching network. It may also need to include circuitry for converting the exit form of the address into the physical address before transmitting on the trunk a packet received from the network. And the need to perform such conversions requires the trunk controller to remember the number of stages in the network, which greatly complicates the initialization of the trunk controller, and also requires changes to trunk controller software when the size of the network, in terms of the number of stages, is changed.

Furthermore, central control of the network, which is responsible for selecting call routes through the network and for setting up the routes by providing equipment such as trunk controllers with the necessary routing information, must be able to translate between the plurality of the address numbers. For this purpose, the central control must have and must maintain a plurality of address translation look-up tables, which adds overhead to the call-handling process. Use of address translation look-up tables also adversely impacts network growth: if the number of network stages changes, address look-up table entries must also change. This makes it difficult to change the networks in the field.

In summary, then, the use of address rotation adds complexity to the configuration and operation of switching systems, increases their cost, decreases their performance, and makes changes to the systems difficult to implement.

SUMMARY OF THE INVENTION

It is these and other disadvantages of the prior art that the present invention is directed to solving. According to the invention, in a multi-stage network for switching packets each of which has a plurality of address elements that correspond with the stages, each switching node of the network is included in one stage and includes an arrangement for indicating which stage includes the node, and an arrangement that responds to the indication and selects from a packet's address elements the element that corresponds to the node's stage as the element on the basis of which the packet is routed at the node. Illustratively, each address element comprises at least one address bit. In such a network, a method of address-element selection at each node involves determining the stage that includes the node, selecting from the address elements of a received packet the element that corresponds to the node's indicated stage, and routing the packet at the node on the basis of the value of the selected element.

According to an embodiment of the invention, in a network for switching packets, each including a multi-bit address for routing the packet through the network, wherein a plurality of switching nodes are interconnected to define a sequence of switching stages and each node is included in one stage, each node includes an arrangement for indicating "how manieth" in the sequence of stages is the node's stage, apparatus responsive to the indication for selecting "that manieth" most significant bit of the address of a received packet, and apparatus responsive to the selection for routing the packet at the node on the basis of the value of the selected bit. The most significant address bit is the bit on the basis of whose value the packet is first switched in the system.

The term "how manieth" refers to where in the sequence of stages a node appears. For example, if the node's stage were the rth stage in a sequence of n stages, the node's indicating arrangement would indicate r. The term "that manieth" refers to the address bit whose significance corresponds to the node's indicated stage. For example, if the indicating arrangement of a node were to indicate r, the selecting apparatus would select the rth most significant address bit.

The inventive method and apparatus have numerous advantages over the address rotation technique. Since address rotation is not performed, address rotation circuitry is eliminated from nodes, making node structure simpler and less expensive. While address bit selection circuitry replaces address rotation circuitry, the selection apparatus can generally be implemented in a simpler and less expensive manner than the rotation circuitry. Avoidance of address rotation saves time, and hence improves the speed of propagation of packets through nodes, thereby improving network performance. In fact, if the address bit corresponding to a particular stage appears in the same bit position in all packets, address bit selection requires no more time than the selection of the most significant address bit in a rotation technique.

Significantly, the method and apparatus of the invention avoid changing the contents of the address field of packets, because the contents do not undergo rotation. Therefore the invention avoids the need to recompute at each node error codes such as CRC codes associated with the packets, and thereby eliminates from the nodes the error code computing circuitry and the delay associated with that circuitry's operation. Since the contents of the packet address field are not changed, only one form of the address—the physical address—is used throughout the packet switching system. Hence circuitry for changing the form of the address between the physical address form and other forms is eliminated, as are address translation tables that keep track of the relationship of the various address forms, and the procedures for maintaining such tables. Structure and operation of packet switching systems is thereby simplified and system performance is improved. And with the elimination of the tables also disappears the need to recompute and change the tables' contents whenever the number of stages in the network is changed. Hence networks can be reconfigured and grown more easily.

These and other advantages and features of the present invention will become apparent from the following description of an illustrative embodiment of the invention taken together with the drawing.

BRIEF DESCRIPTION OF THE DRAWING

FIG. 1 is a block diagram of a packet switching network embodying an illustrative example of the invention;

FIG. 2 is a block diagram of a circuit pack of the network of FIG. 1;

FIG. 3 is a block diagram of a packet switching node of the circuit pack of FIG. 2;

FIG. 4 is a block diagram of the address bit selection circuitry of the controller of the node of FIG. 3; and FIG. 5 is a block diagram of an illustrative packet.

DETAILED DESCRIPTION

Turning now to the drawing, FIG. 1 is a representation of a packet switching network 100 of the type that may be used to configure a packet switching system. In such a system (not shown), trunk controllers interface the network 100 to trunks for communication with other networks and with host interface devices. The network 100 switches packets that it receives over various trunks and that are destined for other trunks and routes the packets on their way through the packet switching system from their source to their destination. The network 100 is illustratively connected to trunk controllers (not shown) by communication links 150. The number of links connecting to a network 100 varies with the size of the network 100 and the number of subtending trunk controllers. While signals may be transmitted over a link in either direction, for purposes of packet transmission the links are unidirectional, in that signal streams that make up packets are transmitted over the links in one direction only. The links 150 may be either bit serial transmission media or bit parallel transmission media.

The switching fabric of the network 100 is a matrix of switching nodes 110 that are interconnected by yet other links 150. The interconnection of the nodes 110 is such that groups of nodes 110 form a sequence of n columns, or n stages, of the matrix of the network 100, with each node 110 being a part of one stage. Nodes 110-1-x (x standing for 1, 2, 3, etc.) of the network 100 are the first in the network 100 to switch packets received over links 150 from trunk controllers, and form a first stage 101 in the sequence of n stages of the network 100; nodes 110-2-x of the network 100 receive packets over links 150 from the nodes 110-1-x of the stage 101, are the second in the network 100 to switch the packets, and form a second stage 102 in the sequence of n stages of the network 100; nodes 110-3-x of the network 100 receive packets over links 150 from the nodes 110-2-x of the stage 102, are the third in the network 100 to switch the packets, and form a third stage 103; and so on.

For illustrative purposes, a sequence of three stages 101–103 is shown in FIG. 1. A network 100 may have as few stages as one, and may also have more than three stages. FIG. 1 suggests that the multi-stage network 100 comprises a sequence of n stages that includes stages other than the stages 101–103.

A stage may include any number of nodes 110—as few as one. For illustrative purposes, FIG. 1 shows each stage as including at least four nodes 110 and suggests that each stage includes other nodes as well.

The nodes 110 of the network 100 are physically distributed over at least one circuit pack 200. A circuit pack 200 is for example a printed circuit board with electronic components of which the nodes 110 are constructed mounted thereon. FIG. 1 illustratively shows the network 100 as comprising four circuit packs 200 and suggests that the network 100 includes other circuit packs as well. One circuit pack 200 is illustratively shown as including the first four nodes, 110-1-1 through 110-1-4, 110-2-1 through 110-2-4, and 110-3-1 through 110-3-4, of the first three stages 101–103, respectively, of the network 100. FIG. 1 suggests that the other circuit packs 200 include other nodes of the first three stages 101–103 and nodes of the other stages of the network 100. A circuit pack 200 may include fewer nodes than 12—as few as one, and alternatively may include more than 12 nodes. The nodes included in a circuit pack may all be of the same stage, or each may be of a different stage, or any combination thereof.

For illustrative purposes, the circuit pack 200 that is shown in FIG. 1 to include the first four nodes of each of the first three stages 101–103 of the network 100 will be taken as representative of all circuit packs. This illustrative circuit pack 200 is shown in greater detail in FIG. 2. FIG. 2 shows that each node 110 of the circuit pack 200 has connected thereto one of a plurality of stage buses 220-x. The buses 220-x serve to indicate to nodes the stages that include them, by conveying to each node 110 information about which stage of the network 100 it is included in. The nodes 110-1-x of the first stage 101 are all connected to bus 220-1. The nodes 110-2-x of the second stage 102 are all connected to bus 220-2. And the nodes 110-3 of the third stage 103 are all connected to bus 220-3.

The bus 220-1 is connected outside of the circuit pack 200 to an indicator 250 which identifies the stage of the sequence of stages of the network 100 that the nodes 110 connected to the bus 200-1 belong to. The indicator 250 generates on the bus 220-1 the number r of the stage in the sequence of n stages that the nodes 110-1-x belong to. The indicator 250 is illustratively a register whose contents are output onto the bus 220-1 and conducted by the bus 220-1 to the nodes 110-1-x. In this example, the indicator 250 is a register whose contents are a one.

The buses 220 are interconnected in a sequence by adders 210. Adder 210-1 has the bus 220-1 connected to one of its input ports and has the bus 220-2 connected to its output port. Adder 210-2 has the bus 220-2 connected to one of its input ports and has the bus 220-3 connected to its output port. The second input port of each adder 210-x is connected in a manner to cause the adder to increment by one the binary number incoming at the other input port. For example, all but the least significant bit inputs of the second input port are grounded, and the least significant bit input of the second input port is connected to a signal line 201 that carries a logical one signal level. Each adder 210-x generates the incremented number at its output port. As a consequence, the bus 220-2 carries a binary value one larger than the value carried by the bus 220-1, and the bus 220-3 carries a binary value one larger than the value carried by the bus 220-2. In this illustrative example, the buses 220-1, 220-2, and 220-3 carry the binary values 1, 2, and 3, respectively. It will be noted that the binary value carried by each bus 220-x is the number r of the stage in the sequence n of stages of the network 100 that nodes 110 connected to that bus belong to.

Considering now the use that the nodes 110 make of information conveyed thereto by the buses 220, attention is turned to FIG. 3 which shows the structure of an illustrative node 110-1-1 which is representative of all nodes 110 of the network 100. The node 110-1-1 is substantially conventional. The node 110-1-1 is a packet switch. It has two packet input ports 2601 and 2602 each of which connects to a link 150 for receiving packets thereon. The node 110-1-1 is capable of buffering one packet received at each input port. The node 110-1-1 also has two packet output ports 2603 and 2604 each of which connects to a link 150 for transmitting packets thereon. The packets received at any packet input port are transmittable to any of the two packet output ports. After receipt of a packet on a packet input port, the address contained in that packet is used to determine to which packet output port the packet should be routed.

The node 110-1-1 also uses the ports 2601–2604 for transmission and reception of acknowledgment signals. The node 110-1-1 transmits an acknowledgment signal at a packet input port to acknowledge receipt of a packet, if any, on that packet input port and to signal readiness to receive the next packet on that packet input port. In turn, the node 110-1-1 does not transmit a packet on a packet output port until it receives an acknowledgment signal on that packet output port.

The operation of the node 110-1-1 is directed by a controller 10. In particular, the controller 10 routes a packet received at an input port of the node 110-1-1 to one of its two output ports. The controller 10 is substantially a finite state machine. Such devices are well known in the art. The controller 10 causes an acknowledgment signal to be transmitted at the packet input port 2601, by activating an acknowledgment sender 11a and enabling a gated line driver 12a. The sender 11a generates the acknowledgment signal. It is, for example, a register which contains the acknowledgment signal code. It shifts out the code upon command from the controller 10. The output of the sender 11a is connected through the gated line driver 12a to the port 2601. When enabled, the driver 12a passes the acknowledgment signal to the port 2601.

Following transmission of the acknowledgment signal at the port 2601, the controller 10 deactivates the sender 11a and disables the driver 12a. The controller 10 then gets ready to receive a packet at the port 2601, by enabling a gated line driver 13a which connects the port 2601 to the input of a packet decoder 14a.

The packet decoder 14a has one output port connected to a buffer 15a which is used to temporarily store a received packet, and another output port connected to the controller 10. The decoder 14a distinguishes the various fields that make up a packet.

An illustrative packet 500 is diagramed in block form in FIG. 5. The packet 500 includes a plurality of fields 501-503. A length field 501 is the first field of the packet 500. It indicates the length of the packet 500, in terms of the number of bits or bytes that are included in the packet 500. The length field in this example occupies nine bits, comprising eight bits of length data and one parity bit. A destination address field 502 is the second field of the packet 500. It contains information for routing the packet 500 through the network 100. In particular, it contains the address of the destination, within the network 100, of the packet 500. The destination address field 502 also occupies nine bits comprising eight address bits 504 and one parity bit. The address bits 504 are arranged in their order of significance. A different bit 504 corresponds with each stage of the network 100. The first address bit 504-1, immediately following the length field 501, is most significant, in that it corresponds with the first stage 101 and its value determines how the packet 500 is to be routed by a node 100-1-x; the following address bit 504-2 is the second most significant address bit in that it corresponds with the second stage 102; the next bit 504-3 is the third most significant bit, corresponding with the stage 103; and so on. Other fields 503 included in the packet 500 include a packet identifier which indicates the type of the packet 500, a logical channel number which serves to identify the communication which the packet 500 is a part of, a data field, a time field, and an error control field.

Upon receipt of a packet 500, the decoder 14a sends the length field 501 and the destination address field 502 to the controller 10. The decoder 14a also sends the received packet 500 to the buffer 15a for storage.

The controller 10 uses the destination address field 502 to decide which of the packet output ports 2603 and 2604 to send the received packet 500 to, and uses the length field 501 to check that the whole packet 500 has been properly received. Following receipt of the packet 500, the controller 10 disables the driver 13a to disconnect the decoder 14a from the port 2601.

Assuming that the received packet is to be transmitted at the port 2603, the controller 10 checks whether it has received an acknowledgment signal at the port 2603. For this purpose the port 2603 is connected through a gated line driver 16a to the input of an acknowledgment receiver 17a. When not transmitting a packet at the port 2603, the controller 10 enables the driver 16a to enable acknowledgment signals to reach the receiver 17a. The receiver 17a compares signals received at the port 2603 with an expected acknowledgment signal. When these match, the receiver 17a notifies the controller 10 over a signal line that an acknowledgment has been received.

If an acknowledgment signal has not been received at the port 2603, the controller 10 waits for it. When the acknowledgment signal is received, the controller 10 disables the driver 16a to disconnect the acknowledgment receiver 17a from the port 2603. The controller 10 then directs a multiplexer 18a to extract the stored packet from the buffer 15a and send it to a switch 19.

The buffer 15a has a plurality of outputs spaced along its length and coupled to the multiplexer 18a, which allow the contents of the buffer 15a to be extracted without the necessity of shifting the contents through the whole length of the buffer. Based on the length of the packet stored in the buffer 15a, the controller 10 specifies to the multiplexer 18a from which buffer output to extract the buffer contents.

The switch 19 selectively couples the outputs of the multiplexer 18a and of another multiplexer 18b to the ports 2603 and 2604. The controller 10 directs the activities of the switch 19 in routing a packet from the output of one or the other of the multiplexers 18a and 18b to one or the other of the ports 2603 and 2604.

Following transmittal of the packet at, let us assume, the port 2603, the controller 10 turns off the multiplexer 18a, reactivates the driver 16a to allow acknowledgment signals to reach the acknowledgment receiver 17a from the port 2603, and activates the acknowledgment sender 11a and driver 12a to cause an acknowledgment signal to be transmitted at the port 2601.

The discussion of the structure and operation node 260 has so far concerned the structure and operation thereof with respect to the ports 2601 and 2603. The node's structure with respect to the ports 2602 and 2604 is an image of that just discussed and comprises the elements 12b-18b which are like the elements 12a-18a. The controller 10 controls the operation of the elements 12b-18b in the same manner as was just discussed. The switch 19 selectively couples the output of the multiplexer 18b to the ports 2603 and 2604.

Turning now to FIG. 4, there is shown an address bit selection circuit 450a of the controller 10, which is that portion of the controller 10 involved in selecting an address bit 504 of the packet destination field 502 of a packet 500 received at packet input port 2601 for routing the packet at the node 110-1-1. The controller 10 includes like circuitry 450b for selecting an address bit 504 of a packet 500 received at the input port 2602.

The input lead from the decoder 14a which conducts the length and destination fields 501 and 502 of a received packet 500 to the controller 10 is connected, among others, to the serial input port of a conventional eight bit shift register 400a. The parallel output port of the register 400a is connected to the data input port of a conventional 1-OUT-OF-8 selector 401a. The selector 401a is, for example, the 74150 multiplexer of Texas Instruments Corporation. The select control input port (SEL CTRL) 440 of the selector 401a is connected to the bus 220-1. The output port of the selector 401a is connected to the D input of a D-type flip-flop 402a.

A pair of counters 403a and 404a have their inputs connected to a BIT CLKA signal line. The output of the counter 403a is connected to the enable (EN) input of the shift register 400a. The output of the counter 404a is connected to the disable (DIS) input of the shift register 400a, to the enable (EN) input of the selector 401a, and to the clock (CLK) input of the flip-flop 402a. A RESETA signal line is connected to clear (CLR) inputs of the counters 403a and 404a, the shift register 400a, and the selector 401a.

The operation of the circuit 450a is as follows. Generally, the BIT CLKA signal line is inactive, the counters 403a and 404a are reset and their outputs are not asserted, and hence the shift register 400a and selector 401a are disabled. When the node 110-1-1 receives a packet 500 at the port 2601 and the decoder 14a transfers the fields 501 and 502 to the controller, each transferred bit of the field 501 causes a pulse on the BIT CLKA line. Each pulse on the BIT CLKA line causes the count of the counters 403a and 404a to increment by one. Nine pulses of the BIT CLKA line indicate receipt by the controller 10 of the length field 501; on the count of nine the counter 403a asserts its output to enable the shift register 400a to receive and store input from the decoder 14a. The bits received by the controller 10 following the length field 501 are the bits 504 of the destination field 502, and the shift register 400a receives and stores the bits 504. Eight additional pulses of the BIT CLKA line—seventeen in total—indicate receipt by the controller 10 of the bits 504 of the destination field 502. On the count of seventeen, the counter 404a asserts its output to disable the shift register 400a, and to enable the selector 401a and the flip-flop 402a. The disabled shift register 400a ceases to accept further input from the decoder 14a and displays the eight bits 504 that it contains at its output port. The selector 401a receives the register 400a contents, and selects one of the bits 504 for output at its output port. The selection is based on the binary value received by the SEL CTRL input port 440 of the selector 401a over the bus 220-1.

In this example, the bus 220-1 conducts the binary number "1" to the selector 401a and hence the sector 401a selects the first, the most significant, bit 504-1. Had the bus 220-1 conducted the binary number "10" to the selector 401a, the selector 401a would have selected the second most significant bit 504-2; the binary number "11" on the bus 220-1 would have caused the selector 401a to select the third most significant bit 504-3; and so on.

Being enabled, the flip-flop 402 responds to the output of the selector 401a and sets its Q output to the binary value output by the selector 401a. Hence, in this example, the binary value of the Q output of the flip-flop 402a represents the value of the bit 504-1. The Q output is connected to a DESTA signal line which conveys the value of the bit 504-1 to other circuitry of the controller 10. The controller 10 routes the packet 500 to one or the other of its output ports 2603 and 2604 as a function of the logical value of the DESTA signal line.

When the controller 10 is done transmitting the packet 500 at the appropriate output port, it asserts the RESETA line to clear and reset the counters 403a and 404a, the shift register 400a, and the selector 401a. The circuit 450a is thereby readied for receiving new input from the decoder 14a.

Of course, various changes and modifications to the illustrative embodiment described above will be apparent to those skilled in the art. For example, nodes having more than two output ports could constitute the network, in which case each node would select, and route a packet on the basis of, an address element comprising two or more address bits. Likewise, address elements of broadcast packets, intended for transmission at all output ports of a node, may comprise other than one address bit. Or the address element selection circuitry may be implemented differently. Such changes and modifications can be made without departing from the spirit and the scope of the invention and without diminishing its attendant advantages. It is therefore intended that such changes and modifications be covered by the following claims.

What is claimed is:

1. A multi-stage packet switching network for switching packets each including a plurality of address elements corresponding with the plurality of network stages, comprising:
   a plurality of switching nodes, each node included in one stage;
   means for indicating to each node which stage includes the node; and
   means responsive to the indicating means for selecting from the address elements of a packet the element that corresponds with the node's stage as the element on the basis of which the packet is routed at the node.

2. A multi-stage packet switching network, for switching packets each including a plurality of address elements corresponding with the plurality of network stages, comprising:
   a plurality of interconnected switching nodes, each node included in one stage;
   means for indicating to each node which stage includes the node;
   each node including means responsive to the indicating means for selecting from the address elements of a packet the element that corresponds with the node's stage; and
   each node including means responsive to the selecting means for routing the packet from the node on the basis of the value of the selected element.

3. The network of claim 2 wherein each address element comprises at least one address bit.

4. The network of claim 2 wherein the indicating means comprise
   means for conducting to each node information identifying the stage.

5. A packet switching network, for switching packets each including an address field of a plurality of address elements arranged in their order of significance for routing the packet through the network, comprising:
   a plurality of switching nodes interconnected to define a sequence of a plurality of switching stages, each node included in one stage;
   means for indicating to each node how manieth in the sequence of stages is the stage that includes the node; and
   each node including means responsive to the indicating means for selecting that manieth most significant element of the address field of a packet as the element on the basis of which the packet is routed at the node.

6. The network of claim 5 wherein each address element comprises at least one address bit.

7. The network of claim 5 wherein the indicating means comprise means for conducting to each node information identifying the stage.

8. The network of claim 5 wherein
   the plurality of switching nodes are interconnected to define a sequence of n switching stages; wherein the indicating means comprise means for indicating the number r in the sequence of n stages of the stage that includes the node; and wherein the selecting means comprise means for selecting the rth most significant element of the address field as the element on the basis of which the packet is routed at the node.

9. The network of claim 8 wherein the indicating means comprise:

a plurality of conductor means each connected to the nodes of a stage for conveying thereto information identifying the associated stage;

means for generating on one conductor means of the plurality of conductor means the number r of the associated stage; and means interconnecting the one conductor means with a second conductor means connected to the nodes of the next stage in the sequence of stages for generating on the second conductor means the number (r+1) of the associated stage.

10. The network of claim 8 wherein each address element comprises one address bit; wherein the indicating means comprise a stage bus for conveying the number r to nodes included in the rth stage; and wherein the selecting means comprise storage means for storing at least n bits of the destination field of a packet, one-out-of (the at least n) select means connected to the stage bus and to the storage means and responsive to the number conveyed by the bus for selecting and outputting the value of the rth most significant bit of the bits stored by the storage means.

11. A packet switching node, for a multi-stage packet switching network having a plurality of nodes each included in one stage, for switching packets each including a plurality of address elements corresponding with the plurality of network stages, comprising:

means for determining which stage includes the node; and means responsive to the determining means for selecting from the address elements of a packet the element that corresponds to the node's stage as the element on the basis of which the packet is routed at the node.

12. A packet switching node for a multi-stage switching network having a plurality of nodes each included in one stage, for switching packets each including a plurality of address elements corresponding with the plurality of network stages, comprising:

means for determining which stage includes the node;

means responsive to the determining means for selecting from the address elements of a packet the element that corresponds with the node's stage; and means responsive to the selecting means for routing the packet at the node on the basis of the value of the selected element.

13. The node of claim 12 wherein each address element comprises at least one address bit.

14. The node of claim 12 wherein the determining means comprise means for receiving information identifying the stage.

15. A packet switching node, for a switching network having a plurality of nodes interconnected to define a sequence of a plurality of switching stages, with each node included in one stage, for switching packets each including an address field of a plurality of address elements arranged in their order of significance for routing the packet through the network, comprising:

means for determining how manieth in the sequence of stages is the stage that includes the node;

means responsive to the determining means for selecting that manieth most significant element of the address field of a packet as the element on the basis of which the packet is routed at the node.

16. The node of claim 15 wherein each address element comprises at least one address bit.

17. The node of claim 15 wherein the determining means comprise means for receiving information identifying the stage.

18. The node of claim 15 wherein the plurality of switching nodes are interconnected to define a sequence of n switching stages; wherein the determining means comprise means for determining the number r in the sequence of n stages of the stage that includes the node; and wherein the selecting means comprise means for selecting the rth most significant element of the address field as the element on the basis of which the packet is routed at the node.

19. The node of claim 18 wherein each address element comprises one address bit; wherein the determining means comprise input port means for receiving the number r of the stage that includes the node; and wherein the selecting means comprise storage means for storing at least n bits of the address field of a packet, and one-out-of (the at least n) select means connected to the input port means and to the storage means and responsive to the number received by the input port means for selecting and outputting the value of the rth most significant bit of the bits stored by the storage means.

20. A method of address element selection in a multi-stage packet switching network having a plurality of nodes each included in one stage, for switching packets each including a plurality of address elements corresponding with the plurality of stages of the network, comprising the steps of:

determining at each node which stage includes the node;

selecting at each node from the address elements of a packet received by the node the element that corresponds with the node's determined stage; and routing the packet at each node on the basis of the value of the element selected at the node.

21. A method of address element selection in a packet switching network having a plurality of nodes interconnected to define a sequence of a plurality of switching stages, with each node included in one stage, for switching packets each including an address field of a plurality of address elements arranged in their order of significance for routing the packet through the network, comprising the steps of:

determining at each node how manieth in the sequence of stages is the stage that includes the node;

selecting at each node that manieth most significant element of the address field of a packet received by the node; and routing the packet at each node on the basis of the value of the element selected at the node.

22. The method of claim 21 in a network further having the plurality of nodes interconnected to define a sequence of n switching stages, wherein the step of determining comprises the step of determining the number r in the sequence of n stages of the stage that includes the node; and wherein the step of selecting comprises the step of selecting the rth most significant element of the address field.

23. The method of claim 22 wherein each address element comprises one address bit, wherein the step of determining comprises the step of receiving the number r; and wherein the step of selecting comprises the steps of storing at least n bits of the address field of the received packet;

selecting from the stored bits the rth most significant bit; and outputting the value of the selected bit.

* * * * *

UNITED STATES PATENT AND TRADEMARK OFFICE
CERTIFICATE OF CORRECTION

PATENT NO. : 4,627,048

DATED : December 2, 1986

INVENTOR(S) : Mikiel L. Larson

It is certified that error appears in the above-identified patent and that said Letters Patent is hereby corrected as shown below:

Column 10, line 10, after "network" insert a comma;
Column 11, line 47, after "node" insert a comma.

Signed and Sealed this

Seventh Day of July, 1992

*Attest:*

DOUGLAS B. COMER

*Attesting Officer*     *Acting Commissioner of Patents and Trademarks*